United States Patent
Hernandez, Jr. et al.

(10) Patent No.: US 7,237,987 B2
(45) Date of Patent: Jul. 3, 2007

(54) REVERSIBLE DRILL AND DRIVE TOOL

(75) Inventors: Hector Ray Hernandez, Jr., Fullerton, CA (US); Jaime Nash, Rancho Santa Margarita, CA (US)

(73) Assignee: Alltrade Tools LLC, Long Beach, CA (US)

( * ) Notice: Subject to any disclaimer, the term of this patent is extended or adjusted under 35 U.S.C. 154(b) by 168 days.

(21) Appl. No.: 10/902,732

(22) Filed: Jul. 29, 2004

(65) Prior Publication Data
US 2005/0031424 A1 Feb. 10, 2005

Related U.S. Application Data

(60) Provisional application No. 60/493,506, filed on Aug. 8, 2003.

(51) Int. Cl.
*B23B 51/08* (2006.01)
(52) U.S. Cl. .................. 408/239 R; 279/14; 7/158; 7/165
(58) Field of Classification Search ............ 408/239 R, 408/238, 240; 279/14, 48, 42, 52; 7/158, 7/165; *B23B 51/08*
See application file for complete search history.

(56) References Cited

U.S. PATENT DOCUMENTS

| | | | | |
|---|---|---|---|---|
| 187,600 A | * | 2/1877 | Collins | ........................ 408/20 |
| 327,969 A | * | 10/1885 | Stowe | .......................... 279/14 |
| 445,533 A | * | 2/1891 | Becher | ......................... 279/14 |
| 1,697,414 A | * | 1/1929 | Cordray | ....................... 279/14 |
| 1,702,810 A | * | 2/1929 | Buhr | ............................ 279/97 |
| 2,359,594 A | * | 10/1944 | Turenchalk et al. | ......... 451/358 |
| 2,842,020 A | * | 7/1958 | Tarquinio | ................... 81/177.2 |
| 3,036,839 A | * | 5/1962 | Williamson, Jr. | ............. 279/24 |
| 4,097,182 A | * | 6/1978 | Rolnick | ................... 408/239 R |
| 4,512,693 A | | 4/1985 | Swanson | |
| 4,676,703 A | | 6/1987 | Swanson | |
| 5,439,005 A | * | 8/1995 | Vaughn | ....................... 600/568 |
| 5,938,212 A | * | 8/1999 | Wadsworth | ................... 279/42 |
| 5,975,815 A | | 11/1999 | Zierpka et al. | |
| 6,270,095 B1 | | 8/2001 | Chang | |
| 6,488,452 B1 | * | 12/2002 | Hoskins et al. | .......... 408/239 R |
| 6,755,423 B2 | | 6/2004 | Chiu | |
| 6,877,937 B2 | * | 4/2005 | Hsiao | .......................... 408/238 |

* cited by examiner

*Primary Examiner*—Daniel W. Howell
(74) *Attorney, Agent, or Firm*—Fulwider Patton LLP

(57) ABSTRACT

A tool adapted to be coupled to a power drill includes a multi-component bit mounted to reverse positions so that in one position its drill element drills a hole and in another position its driver element drives in a fastener.

5 Claims, 11 Drawing Sheets

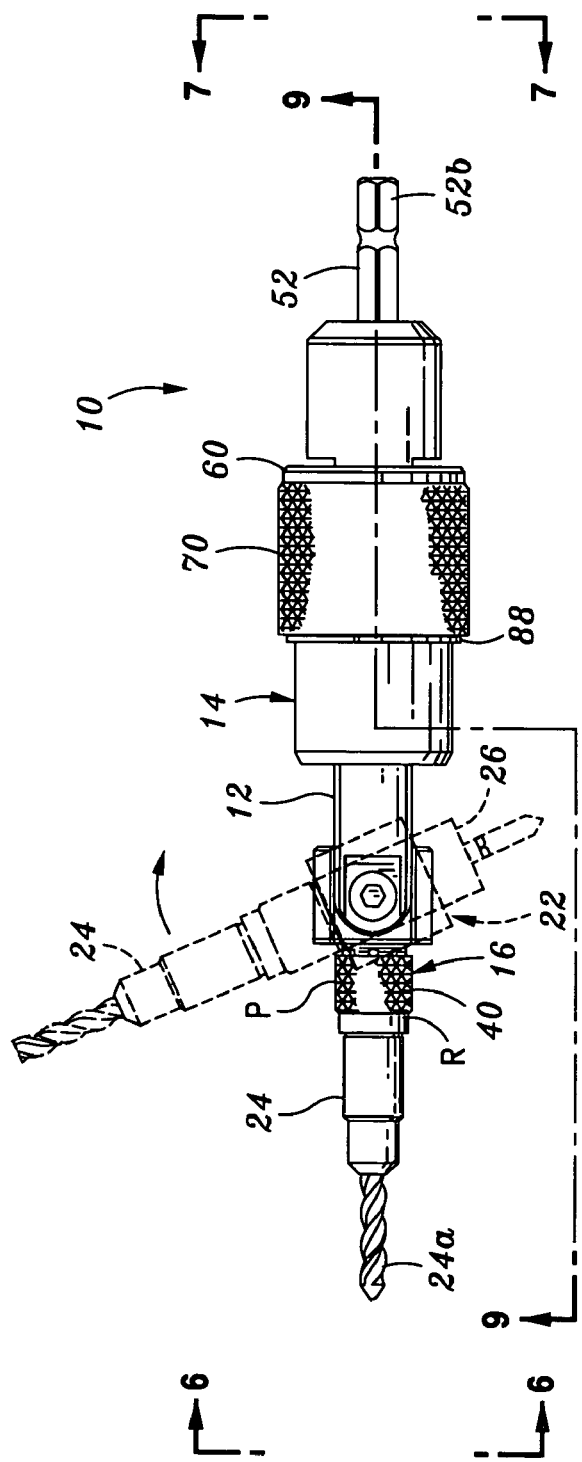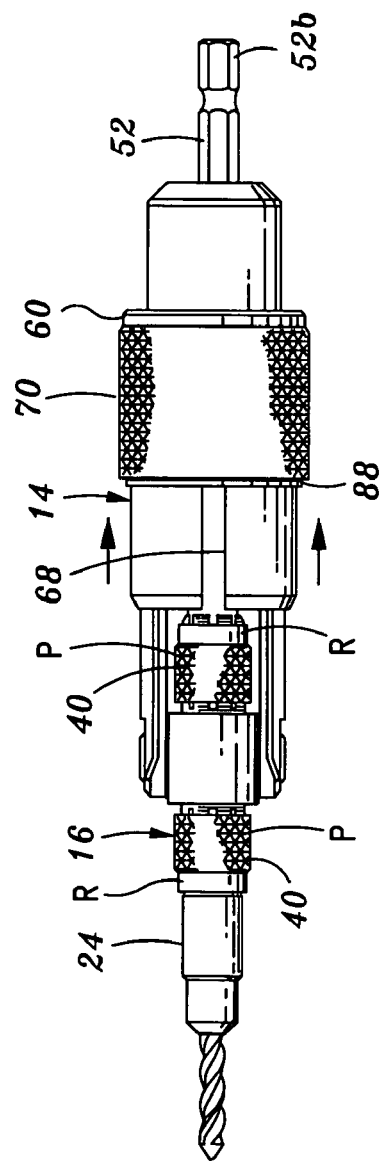

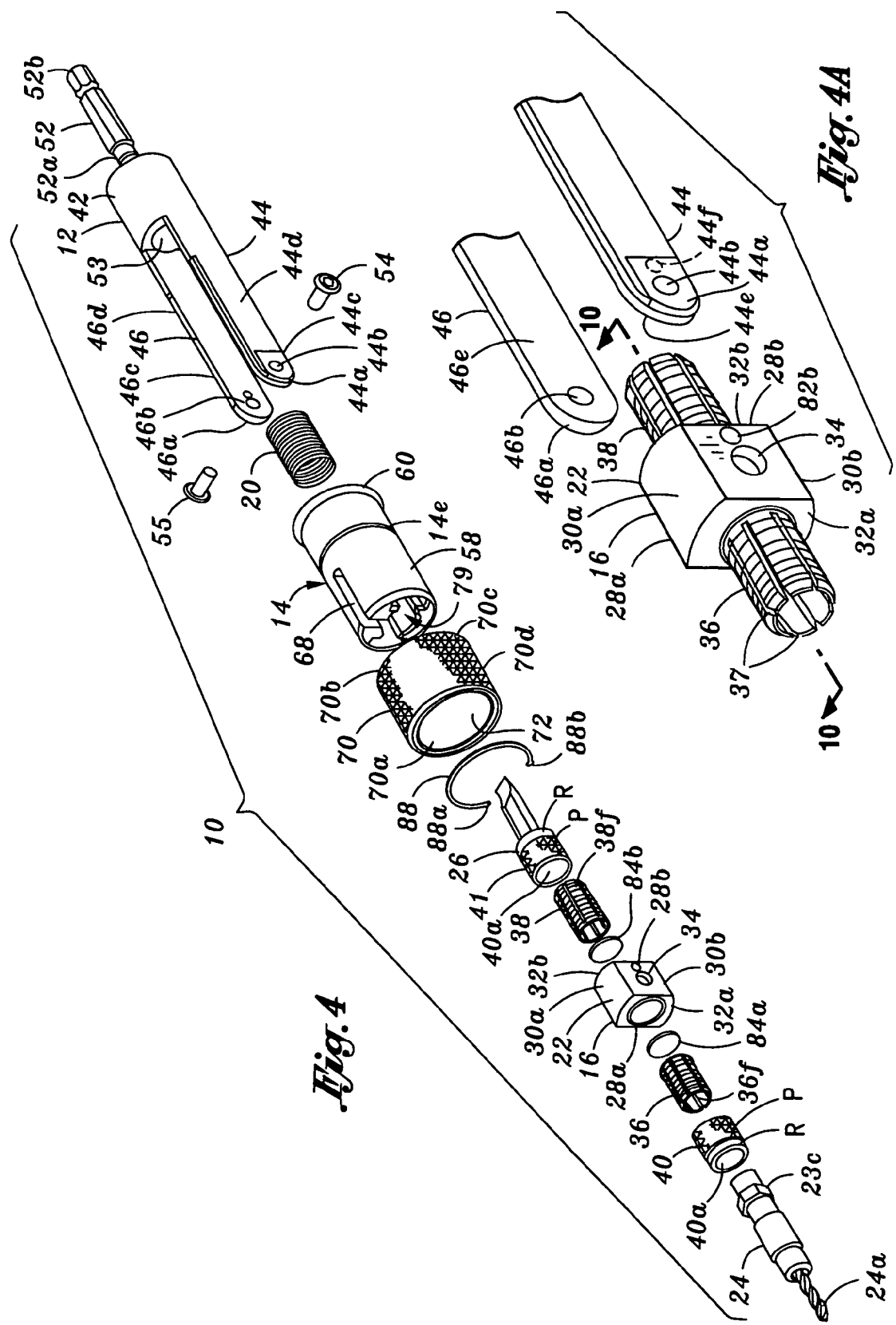

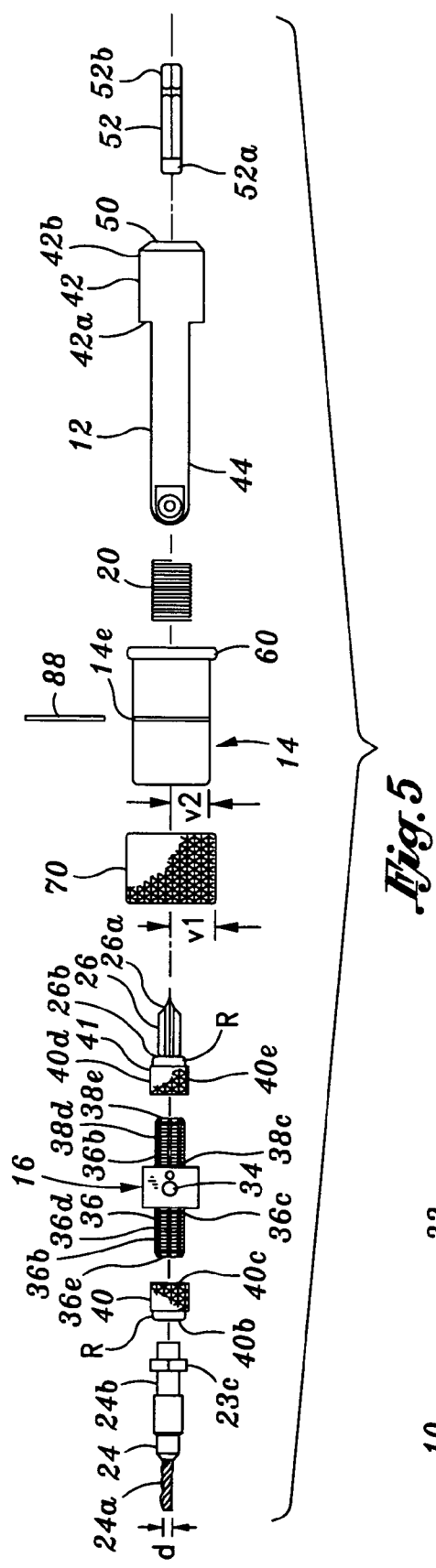
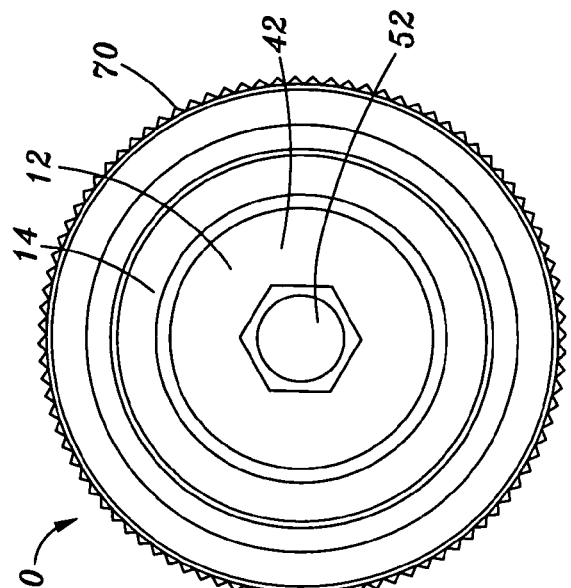
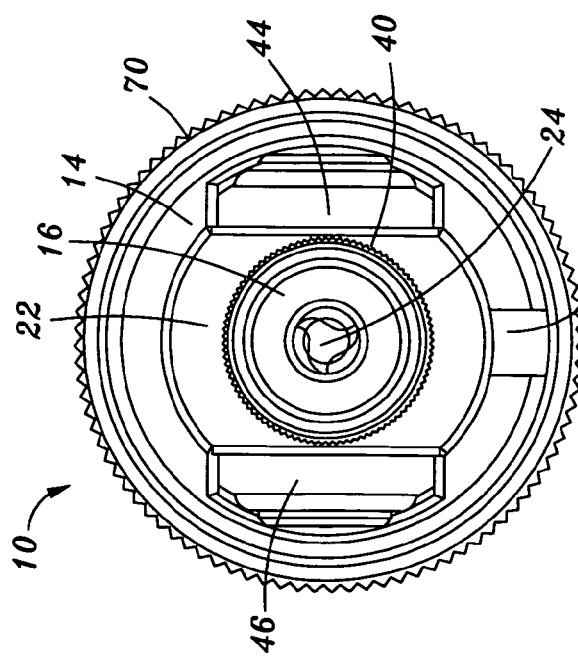

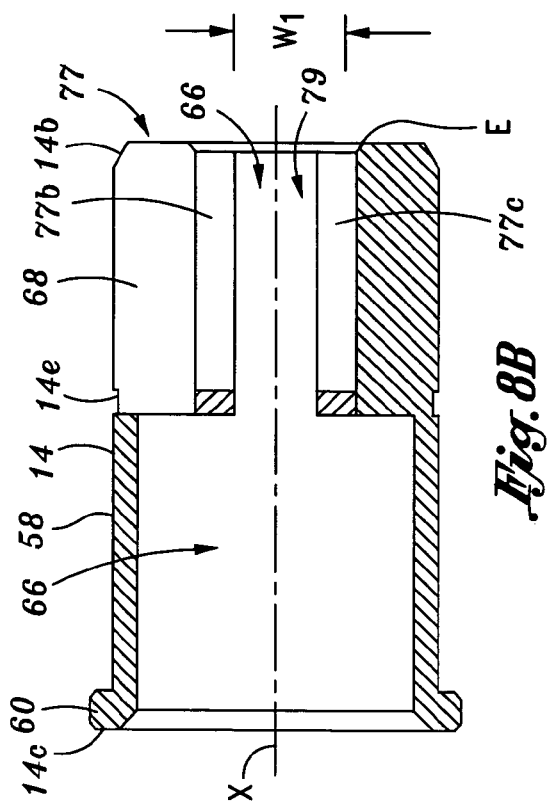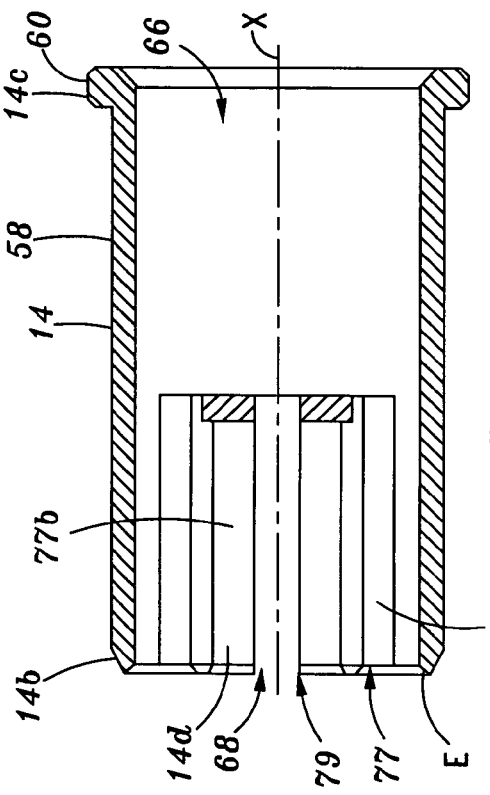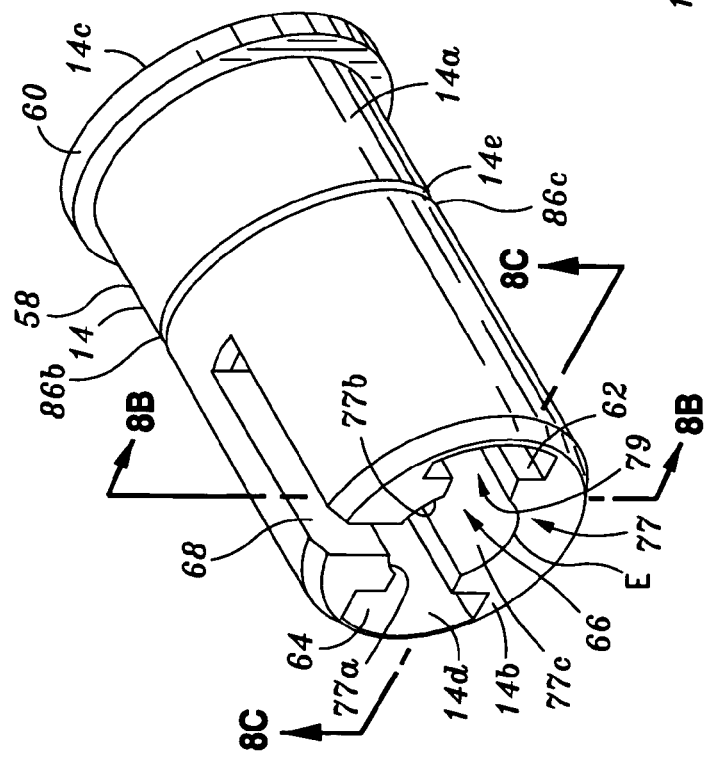

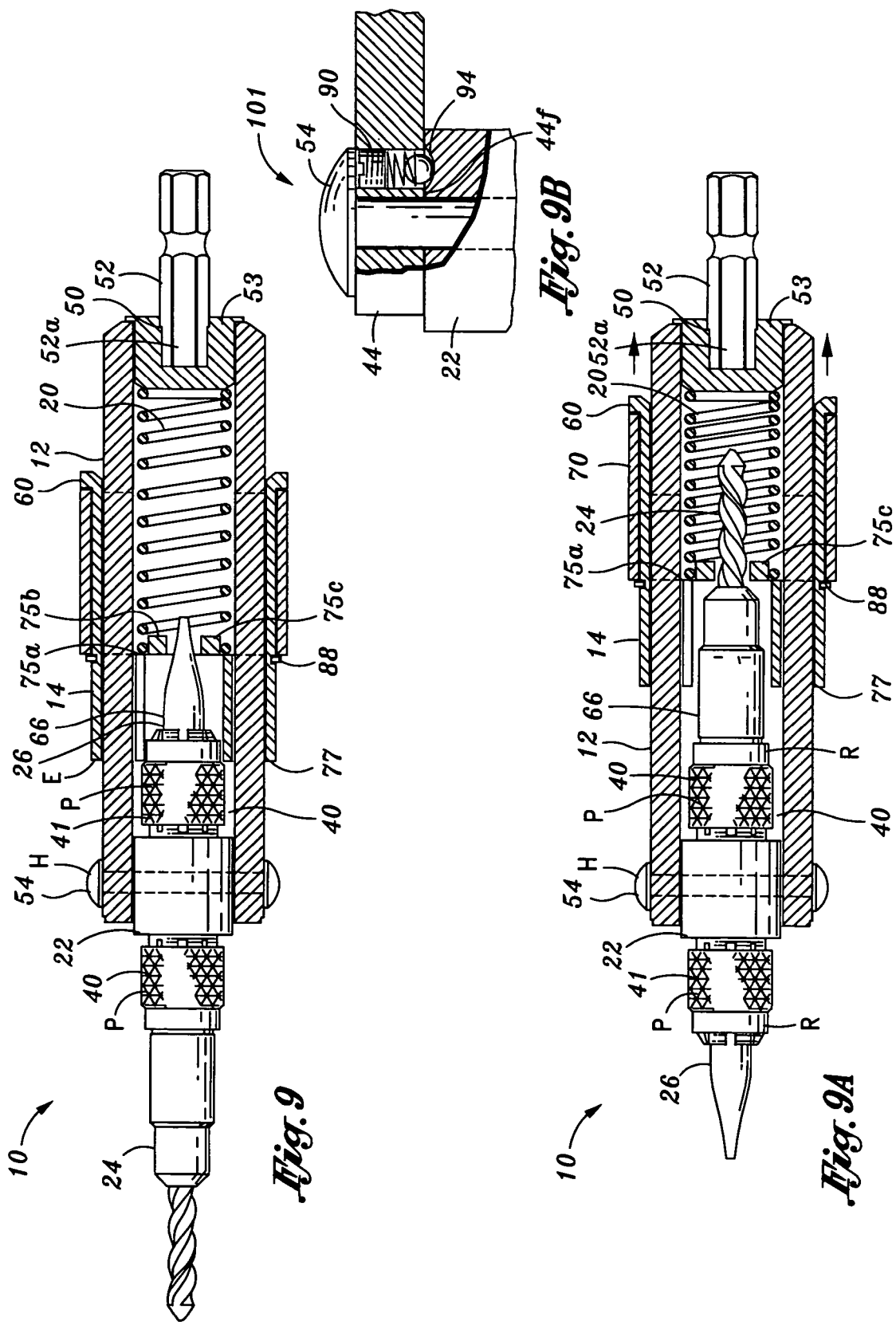

REVERSIBLE DRILL AND DRIVE TOOL

RELATED PATENT APPLICATIONS & INCORPORATION BY REFERENCE

This application is a utility application based on U.S. provisional patent application Ser. No. 60/493,506, entitled "REVERSIBLE DRILL AND DRIVE TOOL," filed Aug. 8, 2003. This related application is incorporated herein by reference and made a part of this application. If any conflict arises between the disclosure of the invention in this utility application and that in the related provisional application, the disclosure in this utility application shall govern. Moreover, the inventors incorporate herein by reference any and all U.S. patents, U.S. patent applications, and other documents cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

In the construction and renovation of commercial and residential buildings as well as in various manufacturing operations, it is often necessary to perform repeated drilling and driving operations. For example, a hole is drilled into a wall or ceiling surface and then a screw or similar fastener is driven into the drilled hole. U.S. Pat. Nos. 4,512,693 and 4,676,703 are illustrative of tools that can be attached to a power drill to allow this drill to both drill a hole and drive in a screw or other type of fastener.

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. The benefits of this invention include, but are not limited to: sturdy construction, ease of operation, convenience of use, increased speed to change bits thereby saving time, and enhanced safety.

Without limiting the scope of this invention as expressed by the claims that follow, some, but not necessarily all, of its features are:

One, the tool of this invention includes a yoke member, a multi-component bit, and a hollow sleeve member.

Two, the yoke member may include a body having a shaft extending outward therefrom in one direction and a pair of spaced apart parallel arms extending outward therefrom in an opposite direction. Each arm terminates in a free end. The arms of the yoke member may be inserted into the sleeve member to straddle an elongated slit in the sleeve member and to extend through a first open end of the sleeve member. The sleeve member may be mounted on the yoke member to enable the sleeve member to be manually moved reciprocally in an axial direction, Three, the multi-component bit includes a drill element and drive element. These elements may be detachably connected to the bit, and the bit may include a magnet that assists in attaching the drill and drive elements to the bit. The driver element and drill element may be aligned and axially oriented in opposed directions, and they each may have a coupling member that detachably connects each of these elements to the bit.

Four, the multi-component bit may include a block member. This block member may have opposed first and second sides, with the driver element detachably connected to the first side by one coupling component, and the drill element detachably connected to the second side by another coupling component. The block member may be positioned between the free ends of the arms, extending through the sleeve member and connected thereto to pivot to reverse the axial orientation of the driver and drill elements. The slit may be sized to enable at least one of the elements to pass therethrough upon pivoting of the multi-component bit.

Five, the sleeve member may be a co-axial with the yoke member, and the sleeve member and yoke member may rotate as a unit. The sleeve member may be moveable reciprocally and axially between a locked position preventing pivoting of the block member and an unlocked position enabling pivoting of the block member. The sleeve member may have opposed first and second open ends and a side wall having therein the elongated slit, which may have one end terminating at the first open end of the sleeve member and another end terminating in an intermediate portion of the side wall. The slit may be parallel to and aligned with the drill and drive elements and may be longer than and wider than the drill and drive elements so both these elements pass through the slit as the bit is rotated. The sleeve member may have a first portion that engages the arms to enable the yoke member and sleeve member to rotate as a unit and a second portion that limits the reciprocal movement of the sleeve member between a first position and a second position. In the first position the second portion engages one of the coupling members to prevent pivoting of the multi-component bit, and in the second position the second portion disengages from the one coupling member to allow the multi-component bit to be manually pivoted to reverse the axial orientation of the drill and driver elements. The sleeve member may include a pair of opposed channels and, each arm of the yoke may be inserted into one of the channels with the arm's free end extending through an open end of the sleeve. The arms may straddle the block member, which may be connected to the free ends to pivot.

Six, a locking member may be used. This locking member may be within the sleeve and it may have a first portion that engages at least one of the arms to enable the yoke member and sleeve to rotate as a unit and a second portion that limits the reciprocal movement of the sleeve between the first position and the second position. The locking member may engage the bit when the sleeve is in a first position and disengage from the bit when the sleeve is moved from the first position to the second position to allow the bit to be rotated. The locking member when in the first position may engage one of the coupling members. In the second position, the locking member may engage one of the elements to prevent rotation of the multi-component bit and disengage therefrom upon the sleeve being manually moved to the second position to allow the bit to be manually rotated to reverse the orientation of the drill and driver element. The sleeve member may include an internal guide member providing a wall segment that creates a receptacle. This receptacle may have an internal surface that is at least partially cylindrical shaped to receive at least a portion of one of the coupling members to lock the block member in position, preventing pivoting of the block member until the sleeve member is moved to the unlocked position. A spring member may be within the sleeve member. This spring member is compressed upon the sleeve member being moved into the second position. The spring member returns the sleeve member to the first position upon release of the sleeve member. There may also be a collar mounted on the sleeve to free wheel.

Seven, a pair of compression collar members may be employed to interact with the coupling members for detachably connecting the drill and drive elements of the bit. A separable coupling member is connected to each collar member. Each coupling member compresses the collar member to which it is connected, holding the element in the collar member securely until the coupling member is at least partially separated from the collar member to which it is connected. At least one of the coupling members may be interactive with the sleeve member to provide a locking function when the sleeve member is in a locked position. The sleeve member may include a guide member that receives a portion of one of the coupling members to lock the block member in position, preventing pivoting of the block member until the sleeve member is moved to the unlocked position. The compression collar members may extend outward from the block member in opposite directions substantially along a longitudinal axis of the tool when the sleeve member is in the locked position. Each collar member may be substantially cylindrical and split with external threaded surfaces. Each coupling member may have a substantially cylindrical external configuration with an internal threaded cylindrical surface so that each coupling member compresses the split collar member to which it is connected as the coupling member is screwed onto its collar member. The split compression collar members may each have a plurality of slots in a sidewall thereof and the ends of the driver and drill elements may each have a base section with corners that slide into the slots upon inserting these elements into the collar members.

These features are not listed in any rank order nor is this list intended to be exhaustive.

DESCRIPTION OF DRAWING

Some embodiments of this invention, illustrating all its features, will now be discussed in detail. These embodiments depict the novel and non-obvious drilling and driving tool of this invention as shown in the accompanying drawing, which is for illustrative purposes only. This drawing includes the following figures (Figs.), with like numerals indicating like parts:

FIG. 2 is a side view of the tool shown in FIG. 1 illustrating the locked position of the tool.

FIG. 3 is top view of the tool shown in FIG. 2 illustrating moving a sleeve to an unlocked position.

FIG. 4 is an exploded perspective view of the tool shown in FIG. 1.

FIG. 4A is a fragmentary, exploded perspective view of a block and associated yoke arms of the tool shown in FIG. 1.

FIG. 5 is an exploded side view of the tool shown in FIG. 2.

FIG. 6 is a bit-end view of the tool taken along line 6—6 in FIG. 2.

FIG. 7 is a drill-end view of the tool taken along line 7—7 in FIG. 2.

FIG. 8A is a perspective view of one embodiment of a sleeve used with the tool shown in FIG. 1.

FIG. 8B is a cross-sectional view of the sleeve taken along line 8B—8B of FIG. 8A.

FIG. 8C is a cross-sectional view of the sleeve taken along line 8C—8C of FIG. 8A.

FIG. 9 is a cross-sectional view of the tool taken along line 9—9 of FIG. 2, showing the drill element extended and the tool in the locked position.

FIG. 9A is a cross-sectional view of the tool similar to that of FIG. 9 but showing the driver element extended and the tool in the unlocked position.

FIG. 9B is a fragmentary cross-sectional view showing a detent mechanism.

DETAILED DESCRIPTION OF SOME
EMBODIMENTS OF THIS INVENTION

Figure 1:
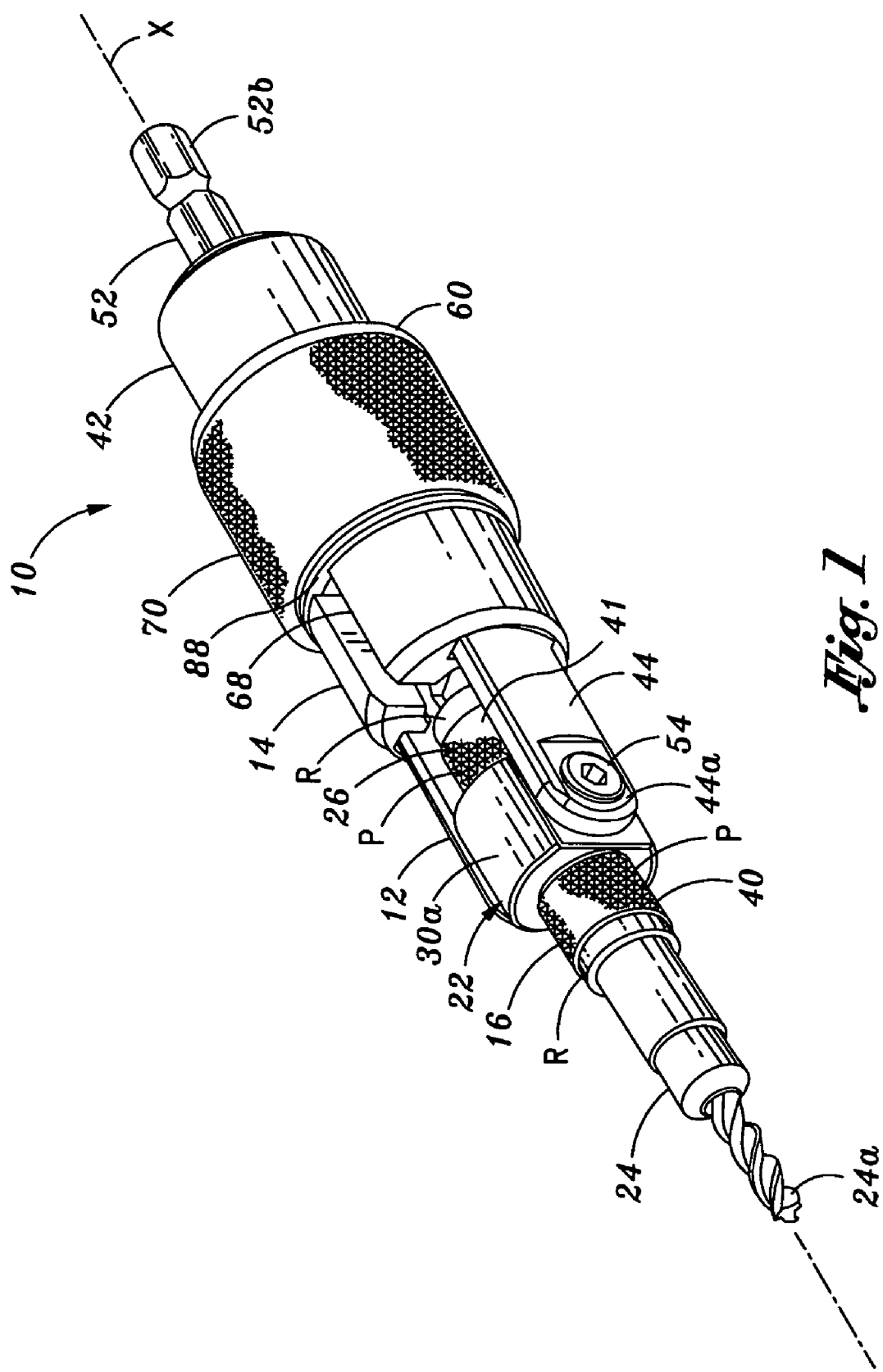
FIG. 1 is a perspective view of the tool according to one embodiment of this invention.

FIG. 1 illustrates one embodiment of this invention, the tool 10. This tool 10 includes a yoke 12 having arms 44 and 46 (FIG. 4) extending through a sleeve 14 carried by the yoke and a multi-component bit 16 including a drill element 24 (FIGS. 11 and 12) and a driver element 26 (FIGS. 13 and 14) that are axially aligned with each other and lie along the longitudinal axis X of the tool 10. The drill element 24 and a driver element 26 are each respectively received within split, threaded compression collars 36 and 38 (FIG. 4A) extending outward in opposite directions from a block 22 disposed along the axis X between, and attached to, rounded, outer free ends 44a and 46a (FIG. 4) of the arms 44 and 46 of the yoke 12.

After inserting the drill element 24 and driver element 26 into the compression collars 36 and 38, thumbnuts 40 and 41 are, respectively, manually screwed onto the compression collars 36 and 38 to hold these elements securely in position. Unloosening these thumbnuts 40 and 41 enables the drill element 24 and a driver element 26 to be manually removed and replaced as desired. As depicted in FIG. 4, the thumbnuts 40 and 41 may each comprise a cylindrical body having a passageway 40a with a threaded inner surface (not shown) extending from an outer end 40b (FIG. 5) to an inner end 40c (FIG. 5). The thumbnuts 40 and 41 may have a knurled outer surface 40e comprising multitude ridges 40d that aid a user to grasp the thumbnuts.

A locking mechanism is provided to lock the block 22 and the attached multi-component bit 16 in one of the following selected positions: In position 1, as shown in FIG. 9, the drill element 24 extends outward in a ready to use position, or in position 2, as shown in FIG. 9A, the driver element 26 extends outward in a ready to use position. As discussed subsequently in greater detail, the unique internal configuration of the sleeve 14 interacts with an outer smooth annular rim R (FIG. 4) of one of the thumbnuts 40 and 41 to provide the locking mechanism. As shown in FIG. 2, the block 22 is mounted to pivot to reverse the positions of the drill element 24 and driver element 26. To achieve this, first the sleeve 14 is manually moved from a locked position as shown in FIG. 9 axially along the yoke 12 to compress a spring 20 seated inside the yoke 12. As shown in 9A, this unlocks the locking mechanism, allowing the multi-component bit 16 to be manually pivoted and rotated in a clockwise direction as shown in FIG. 2 to reverse the orientation of the drill element 24 and drive element 26. A drive element 26 that is relatively short in length clears the bit-end of the sleeve 14 as the multi-component bit 16 rotates with this sleeve in the unlocked position. (As discussed subsequently in greater detail, when a drive element that is relatively long is employed, an alternate embodiment of the sleeve shown in FIGS. 15 through 20 is used.) When the drill and drive elements 24 and 26 are reversed, but again aligned along the longitudinal axis X, the user releases his or her grasp of the sleeve 14 and the spring 20 returns the sleeve 14 to the locked position shown in FIG. 9.

Typically, the block 22 and compression collars 36 and 38 are a unitary metallic structure made by conventional machining processes. As best illustrated in FIG. 4A, the block 22 is substantially brick shaped, having a pair of opposed flat sidewalls 28a, 28b, a pair of opposed rounded sidewalls 30a, 30b, a flat walled drill-side 32a, and a flat walled driver-side 32b. A hole 34 extends between the pair of opposed flat sidewalls 28a, 28b and may be centrally located between the pair of opposed, rounded walls 30a, 30b and the drill-side 32a and the driver-side 32b. The compression collars 36 and 38 each have six longitudinal slots 37 equally spaced apart to correspond to corners of a hexagonal shaped connector.

Figure 21:
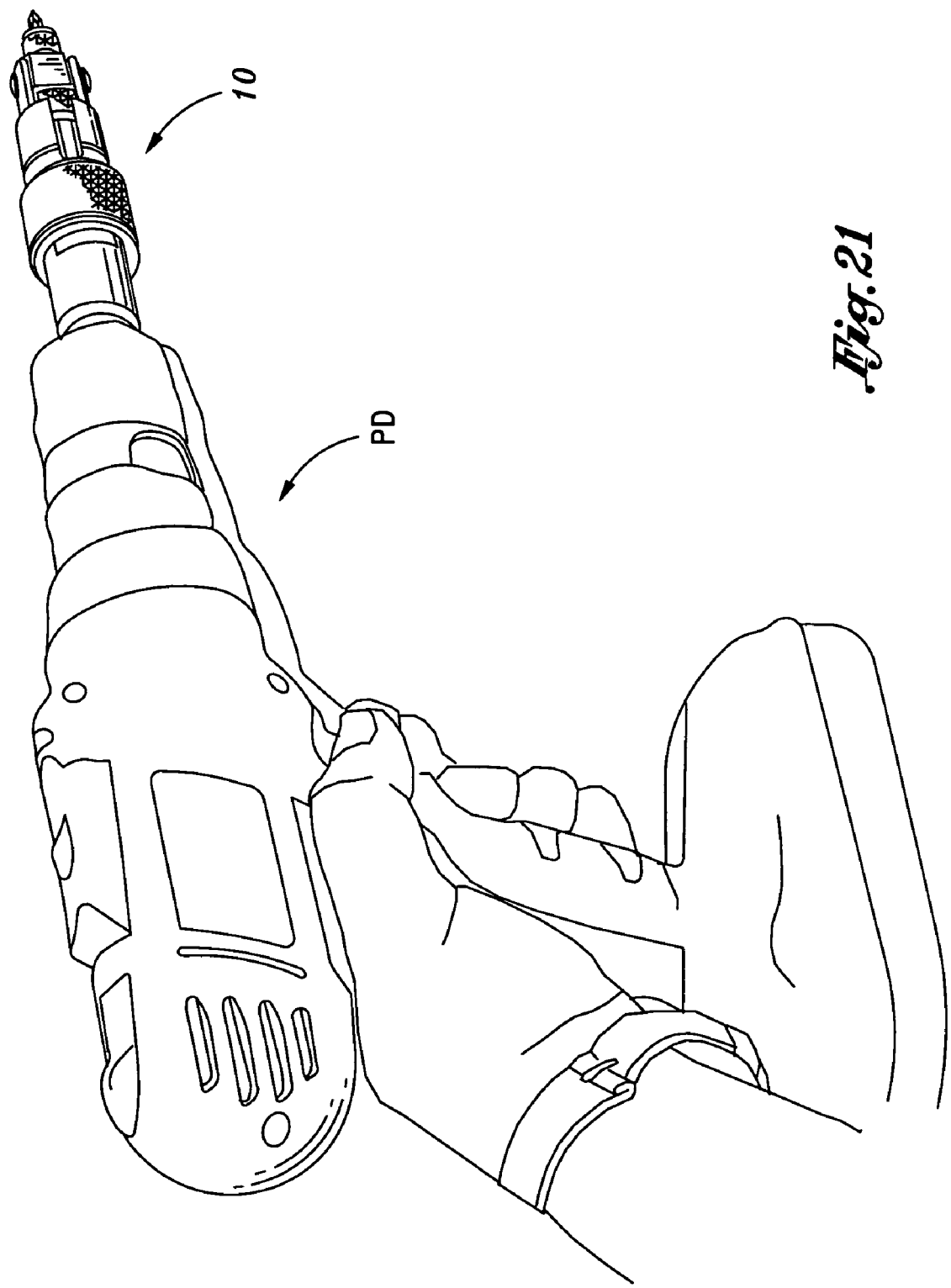
FIG. 21 is a perspective view of the tool of this invention attached to a power drill.

Referring to FIGS. 4, 5 and 7, the yoke 12 includes a yoke body 42 with the arms 44, 46 extending outward in one direction from this yoke body 42 and a shaft 52 extending outward in the opposite direction. The shaft 52 may have a hexagonal cross-section. The yoke body 42 is substantially cylindrical having a bit-end 42a and a drill-end 42b. The drill-end 42b may contain a hole 50 in the yoke body 42 into which a bit-end 52a of the shaft 52 is force fitted. For example, the bit-end 52a may be seated in a plug 53 (FIG. 9A) and the plug forced into the hole 50. The drill-end 52b of the shaft 52 is inserted into a power drill PD shown in FIG. 21 when the tool 10 is connected to this power drill.

As best shown in FIG. 4A, the pair of yoke arms 44, 46 extend perpendicularly from the bit-end 42a (FIG. 5) of the yoke body 42 and are substantially parallel. The arms 44, 46 are directly opposite each other and each has a substantially rectangular configuration. Each arm 44, 46 may have a hole 44b, 46b located near the rounded outer end 44a, 46a of each arm, and these holes 44b, 46b are aligned. Each hole 44b, 46b may lie in one of a pair of recessed portions 44c, 46c of each arm located on the outer surface 44d, 46d of each arm, respectively. The depth of each recessed portion 44c, 46c may be equal to the thickness of the heads H of a pair of connector pins 54, 55 that pass through the holes 44b, 46b, respectively. The block 22 is fastened to the yoke 12 by placing it between the yoke arms 44 and 46, aligning a hole 34 through the block with holes 44b, 46b, and passing the pin 54 through hole 44b, and the pin 55 through hole 46b. The pin 54 has its inner end screwed or force fitted into a cavity in an inner end of the other pin 55, so that, upon connection, these pins are joined together and provide a fulcrum about which the block 22 pivots. Adjacent the holes 44b is an aperture 44f that is part of a dent mechanism discussed subsequently in greater detail in connection with FIG. 9B.

Referring to FIGS. 4, 8A, 8B, and 8C, the sleeve 14 is a cylindrically shaped body 58 (FIG. 8A) having a lip 60 at the drill-end 14c. This lip 60 prevents axial movement in a direction towards the shaft 52 of a cylindrical gripping member 70 co-axially mounted on the sleeve 14. As shown in FIG. 5, the cylindrical gripping member 70 has an inner radius $r_1$ that is greater than the outer radius $r_2$ of the sleeve 14, such that the cylindrical gripping member 70 may free wheel on the sleeve. A C-clip 88 prevents axial movement in a direction towards the block 22 of the gripping member 70. In an intermediate portion of the yoke body 42 there is a partially circular groove 14e with orifices 86b and 86c (FIG. 4) at its opposed ends. The opposed ends 88a and 88b of the C-clip 88 are pushed into these orifices 86b and 86c with the C-clip 88 bowed slightly to create tension to hold it securely in place. This manner of mounting the gripping member 70 to free wheel on the sleeve 14 enables a user to hold the gripping member with one hand while holding the power drill with his or her other hand. The outer surface 70c of the gripping member 70 may have knurled surface including ridges 70d that aid a user to grasp this gripping member.

As best illustrated in FIGS. 8A, 8B, and 8C, the sleeve 14 includes a cylindrical wall 14a forming an internal passageway 66 between the bit-end 14b and the drill-end 14c of the sleeve 14. A slit 68 intersects the wall 14a, extending from the bit-end 14b of the sleeve 14 and terminating in an intermediate portion of the wall about midway between the bit-end 14b and the drill-end 14c of the sleeve. The width $w_1$ of the slit 68 is greater than the diameter $d_1$ of the drill 24a of the drill element 24. An internal guide member 77 within the wall 14a, and integral therewith, provides wall segments 77a, 77b, 77c that create an opened ended receptacle 79 that forms part of the locking mechanism. This internal guide member 77 also forms a pair of opposed, open sided internal channels 62, 64 for the yoke arms 44, 46. The channel 62 is on one side of the receptacle 79 and the channel 64 on the other side of the receptacle.

The guide member 77 projects inward from the bit-end 14b of the sleeve 14 towards the drill-end 14c of the sleeve 14, terminating in a ledge 75a (FIG. 9) that is nearly halfway between the bit-end 14b and drill-end 14c of the sleeve. As shown in FIG. 9, projecting from this ledge 75a are opposed fingers 75b and 75c that fit into an inner end of the coiled spring 20 to maintain the axial alignment of the spring, preventing sideways drift of the spring during movement of the sleeve 14. The wall segments 77a, 77b, 77c forming the internal guide member 77 have curved surfaces that are sections of a cylinder, the receptacle 79 has, at least in part, a cylindrical shape. Because of its substantially cylindrical configuration, the receptacle 79 is adapted to receive the outer smooth annular rim R of the thumbnut 40 or thumbnut 41, as the case may be, upon locking the multi-component bit 16 in position with the drill element 24 and drive element 26 aligned with the longitudinal axis X. When in the locked position with the drill and drive elements 24 and 26 aligned with the longitudinal axis X, a raised knurled cylindrical portion P of the thumbnut 40 or thumbnut 41 is received in the receptacle 79 and abuts an edge E (FIG. 9) forming an open mouth of the receptacle 79. Each open channel 62, 64 is adjacent an outer side 14*d* of the sleeve 14, has an outer surface that is a segment of a cylinder, and is open ended at both the bit-end 14*b* of the sleeve and the drill-end 14*c* of the sleeve. The yoke arms 44 and 46 are inserted through the channels 62 and 64, respectively. When inserted, the yoke arms 44 and 46 are sufficiently spaced from the walls forming the curved channels 62 and 64 to allow the sleeve 14 to slide axially, but the fit between them is sufficiently tight to prevent rotation of the sleeve relative to the yoke arms. Thus, the sleeve 14 with the yoke arms 44 and 46 extending therethrough rotate as a unit.

Figure 11:
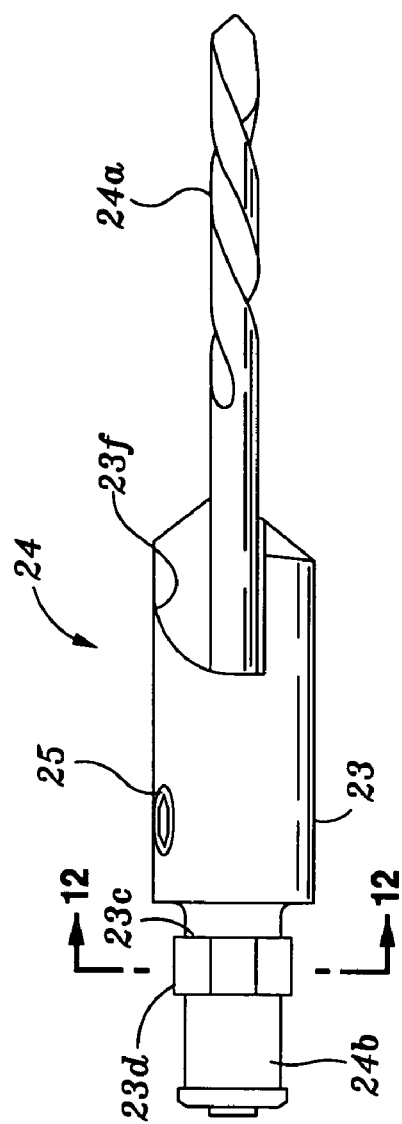
FIG. 11 is a side view of a drill element used with the tool of this invention.
Figure 12:
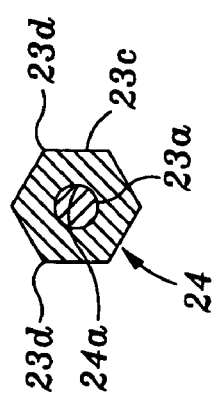
FIG. 12 is a cross-sectional view taken along line 12—12 of FIG. 11.
Figure 13:
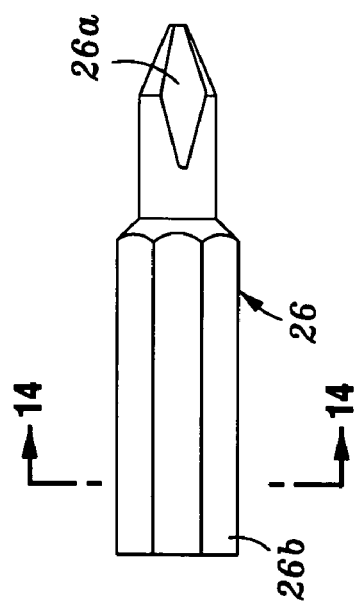
FIG. 13 is a side view of a driver element used with the tool of this invention.
Figure 14:
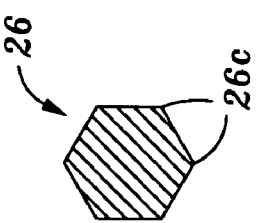
FIG. 14 is a cross-sectional view taken along line 14—14 of FIG. 13.
Figure 16:
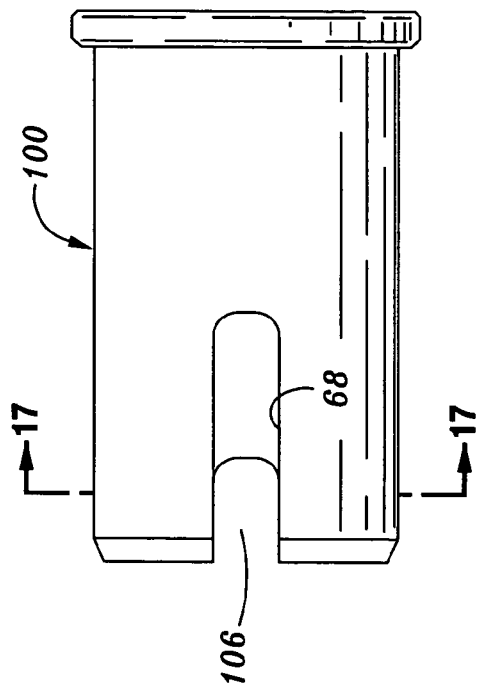
FIG. 16 is a top plan view of the sleeve shown in FIG. 15
Figure 17:
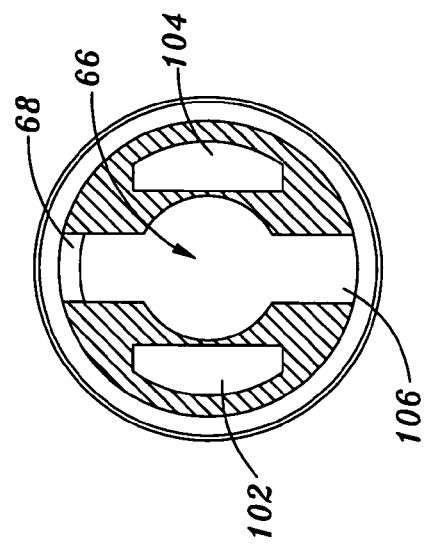
FIG. 17 is a cross-sectional view of the sleeve shown in FIG. 16 taken along line 17—17 of FIG. 16.
Figure 15:
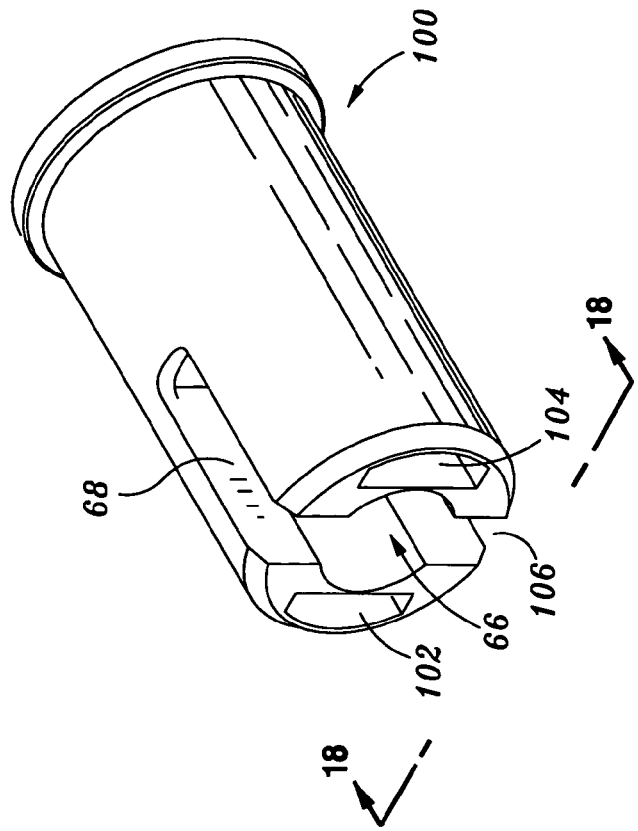
FIG. 15 is a perspective view of an alternate embodiment of a sleeve used with the tool shown in FIG. 1.
Figure 20:
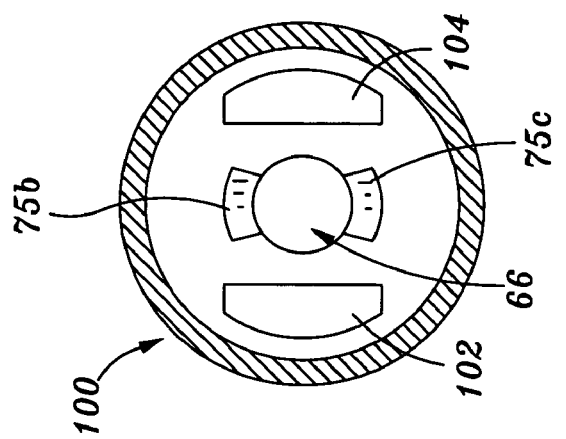
FIG. 20 is a cross-sectional view of the sleeve shown in FIG. 16 taken along line 20—20 of FIG. 19.
Figure 19:
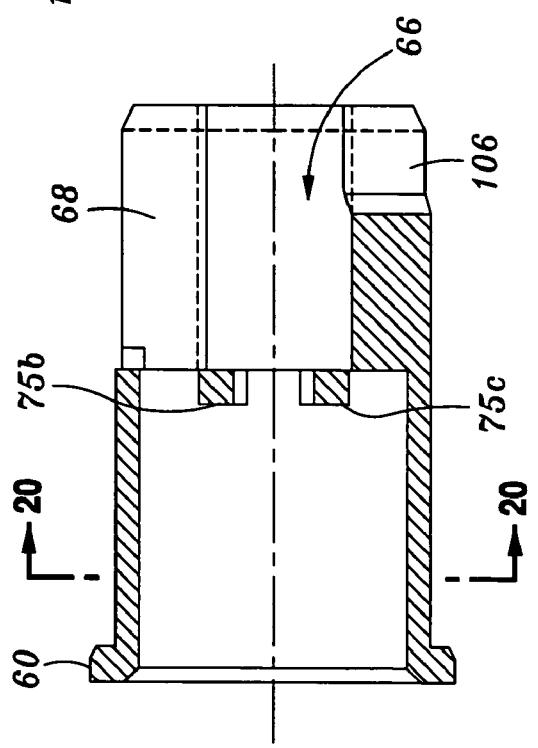
FIG. 19 is a cross-sectional view of the sleeve shown in FIG. 16 taken along line 19—19 of FIG. 18.
Figure 18:
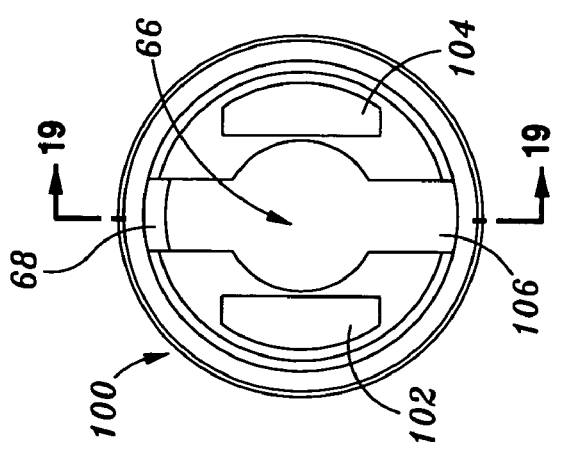
FIG. 18 is a bit-end view of the sleeve shown in FIG. 16 taken along line 18—18 of FIG. 15.

As illustrated in FIGS. 11 and 12, the drill element 24 is of conventional design including a housing 23 having a passageway 23*a* therethrough. The housing 23 includes a countersink portion 23*f* and a mounting base portion 24*b* having a hex nut section 23*c* with six corners 23*d*. The housing holds the drill 24*a*, which is removable. The drill 24*a* extends through the passageway 23*a* and is held in position in the housing 23 by an Allen screw 25. As illustrated in FIGS. 13 and 14, the driver element 26 is of conventional design including a driving head portion 26*a* and base portion 26*b* having a hexagonal cross-section with six corners 26*c*. Examples of such a drill element 24 and driver element 26 are sold by the All trade Tools LLC, among others.

Figure 10:
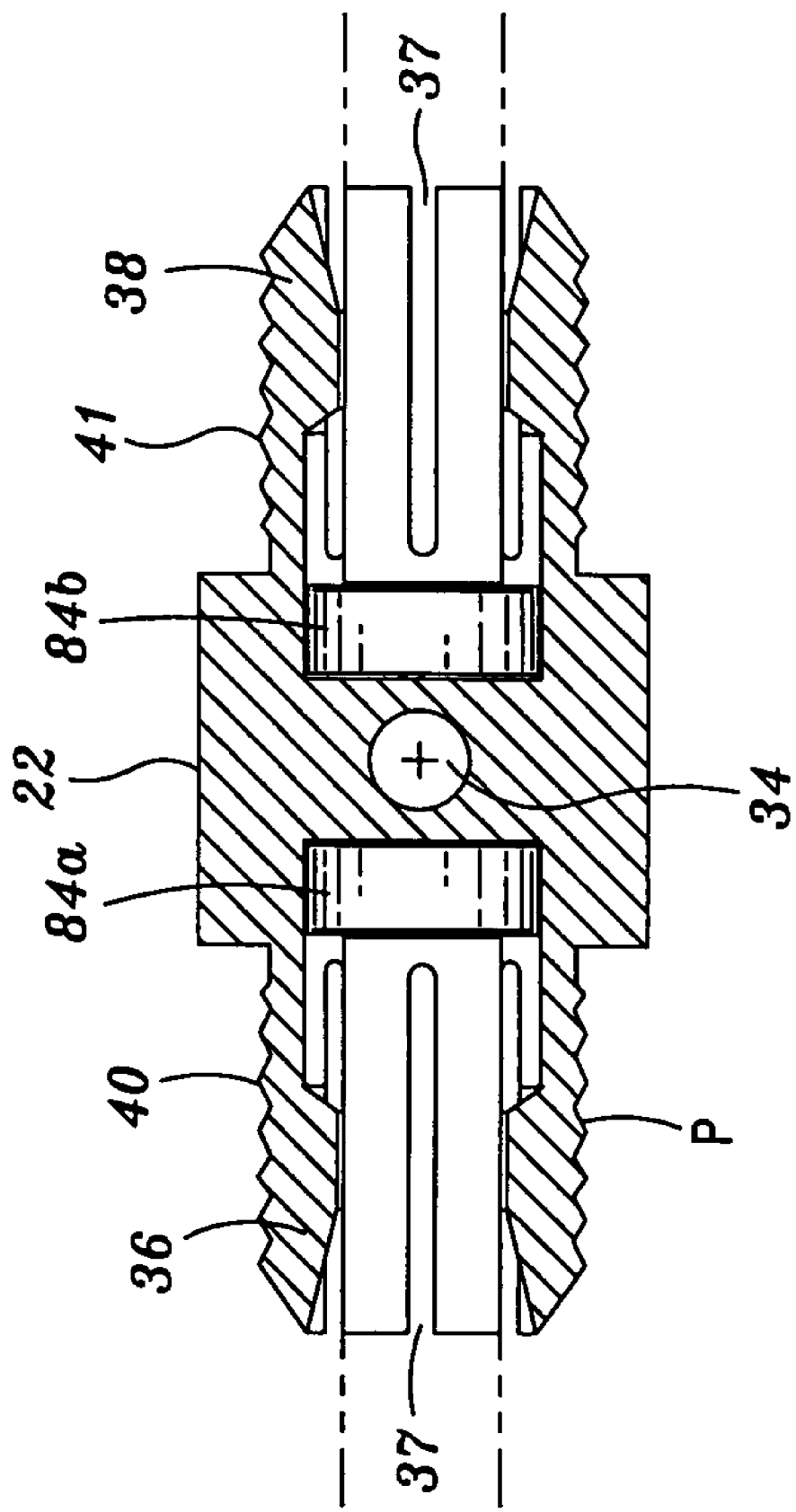
FIG. 10 is a cross-sectional view of the tool taken along line 10—10 of FIG. 4A.

The drill element 24 and driver element 26 are coupled to the block 22 to lie opposed to each other by inserting the base portions 24*b*, 26*b*, respectively, into the compression collars 36, 38. The corners of these base portions 24*b*, 26*b* are aligned to slide into the slots 37 in the compression collars 36, 38. The drill element 24 and driver element 26 may also be magnetically attached to the block 22. As depicted in FIG. 10, disk-shaped magnets 84*a* and 84*b* may be lodged in a fixed location within the block 22. These magnets 84*a* and 84*b* will pull the metallic base portions 24*b*, 26*b*, respectively, of drill element 24 and drive element 26 into the compression collars 36, 38.

As an optional feature, a conventional detent mechanism 101 shown in FIG. 9B provides, upon moving the multi-component bit 16 from an unlocked to a locked position, a snapping sound or feel to notify a user when the block 22 is properly positioned and drill element 24 and driver element 26 are axially aligned. This detent mechanism 101 includes a spring 90, a ball 92, and a hemispherical indentation 94 in the block 22 in which the ball is seated. The spring 90 passes through the aperture 44*f* and bears against the ball 92. The head H of the pin 54 holds this assembly together when connected to the pin 55.

Alternate Sleeve

As shown in FIGS. 15 through 20, a sleeve 100 may be used instead of the sleeve 14. One difference between these two sleeves 14 and 100 is that the sleeve 100 is stronger, because its uses closed channels 102 and 104. The arms 46 and 44 of the yoke 12 respectively extend through these channels 102 and 104. Another difference between these two sleeves 14 and 100 is that the sleeve 100 has a short slit 106 opposite the slit 68. This short slit 106 accommodates a longer driver element (not shown) than the driver element 26. Specifically, if a long driver element is used, with the sleeve 14 pulled towards the shaft 52 during unlocking and the multi-component bit 16 rotated clockwise as shown in FIG. 2, the tip of the long driver element will strike the wall 14*a*, preventing reversal of the orientation of the drill element 24 and driver element 26. The short slit 106 provides an opening to enable the long driver element to pass therethrough when the multi-component bit 16 is rotated clockwise as shown in FIG. 2.

In Use

The tool 10 is used to drill a hole and then drive a screw or other type of fastener into the drilled hole if desired. As shown in FIG. 9, the tool 10 is in a drill-ready position with the drill element 24 positioned externally of the sleeve 14 which is in a forward position, and the multi-component bit 16 in a locked position where the rim R of thumbnut 41 of the driver element 26 is within the receptacle 79 and its raised portion P abutting the edge E (FIG. 9) of the receptacle 79.

To drive, for example, a Phillips head screw (not shown) the driver element 26 is used in the multi-component bit 16. The tool 10 is unlocked by the user with one hand grasping the exposed portions of the arms 44 and 46 of the sleeve 14 and with his or her other hand grasping the sleeve and pulling it towards the shaft 52. This withdraws the thumbnut 41 from the receptacle 79, allowing the user to now pivot the block 22, rotating the multi-component bit 16 clockwise as shown in FIG. 2. The user rotates the block 22 until the drill 24*a* passes through the slit 68 and is aligned with the longitudinal axis X. This changes the orientation of the drill element 24 and the driver element 26 so they reverse positions as shown in FIG. 9A. The detent mechanism 101 notifies the user when proper orientation is achieved. The user now releases his or her grasp of the sleeve 14 and the spring 20 pushes the sleeve 14 towards the repositioned drill element 26. As the sleeve 14 advances, the rim R of the thumbnut 40 is pushed into the receptacle 79 with its raised portion P abutting the edge E of the receptacle 79, locking the tool 10 in position with the driver element 26 in a ready to use position. Because a sort driver element 26 is used, it clears the sleeve 14 as discussed above. If a long driver element is used, the sleeve 100 is substituted for the sleeve 14.

To again reverse the orientation of the driver element 26 and drill element 24, the sleeve 14 is again pulled towards the shaft 52. The user now rotates the multi-component bit 16 counter-clockwise as viewed in FIG. 2, so the drill 24*a* moves from within the sleeve 14 and passes through the slit 68. This counter-clockwise rotation is continued until the drill element 26 is aligned with the longitudinal axis X. The detent mechanism 101 again notifies the user that the axial alignment is correct, and the user releases his or her grasp of the sleeve 14. The spring 20 now pushes the sleeve 14 into engagement with the thumbnut 41, which is reinserted into the receptacle 79 as discussed above.

The invention claimed is:

1. A tool including:
   a yoke having a pair of arms that each have a free end, the yoke having a shaft extending outwardly in a direction opposite to that of the arms;
   a block mounted to pivot between the arms of the yoke, the block including a pair of split compression collars with external threaded surfaces, the collars extending outward from the block in opposite directions, wherein, mounted on each collar is an internally threaded coupling member for compressing the collar upon being screwed onto the collar, one collar being configured to receive a detachable drill element, the other collar being configured to receive a detachable drive element;
   a sleeve mounted on the yoke to move reciprocally in an axial direction between first and second positions, the sleeve being configured to restrain the block from pivoting when the sleeve is in the first position, and to permit the block to pivot when the sleeve is in the second position; and a spring within the sleeve that is compressed upon the sleeve being moved into the second position, the spring biasing the sleeve to the first position upon release of the sleeve;

wherein the sleeve has a surface defining a receptacle;

wherein each coupling member comprises a smooth surfaced first cylindrical portion having a first diameter sized to fit in the receptacle, and a knurled surfaced second cylindrical portion having a second diameter larger than the first diameter and sized to not fit in the receptacle, the second cylindrical portion being separated from the first cylindrical portion by a raised shoulder; and wherein the sleeve and the block are positioned in relation to each other such that, when the spring biases the sleeve to the first position, the sleeve captures within the receptacle the first portion of one of the coupling members so as to restrain the block from pivoting.

2. The tool of claim 1, wherein, when the spring biases the sleeve to the first position, the raised shoulder of said one of the coupling members is pushed into abutment with the surface of the sleeve.

3. The tool of claim 1, wherein the receptacle has an internal surface that is at least partially cylindrical shaped.

4. The tool of claim 1 wherein the sleeve includes a pair of opposed channels, and each arm of the yoke is inserted into one of the channels whereby the sleeve and the yoke are rotationally fixed to each other.

5. The tool of claim 1 wherein the sleeve includes an elongated slit configured to permit one of the drill or the drive elements to pass through the slit as the block pivots.

* * * * *